Sept. 22, 1936. A. J. MOTTLAU 2,055,239
CLUTCH
Filed Nov. 24, 1931 3 Sheets-Sheet 1

INVENTOR.
August J. Mottlau
BY
ATTORNEY.

Sept. 22, 1936.  A. J. MOTTLAU  2,055,239
CLUTCH
Filed Nov. 24, 1931  3 Sheets-Sheet 2
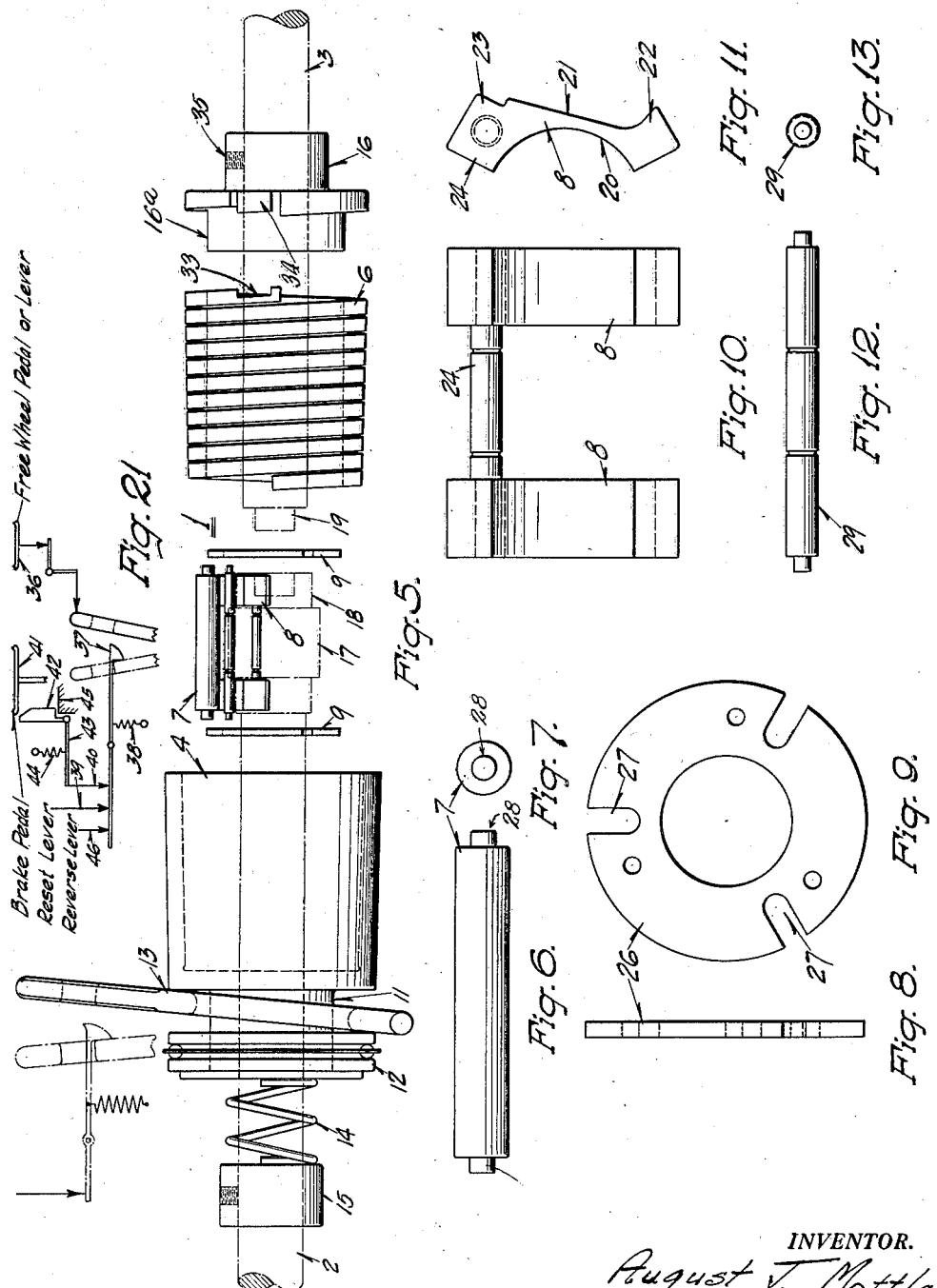
INVENTOR.
August J. Mottlau
BY
ATTORNEY.

Sept. 22, 1936.  A. J. MOTTLAU  2,055,239
CLUTCH
Filed Nov. 24, 1931  3 Sheets-Sheet 3
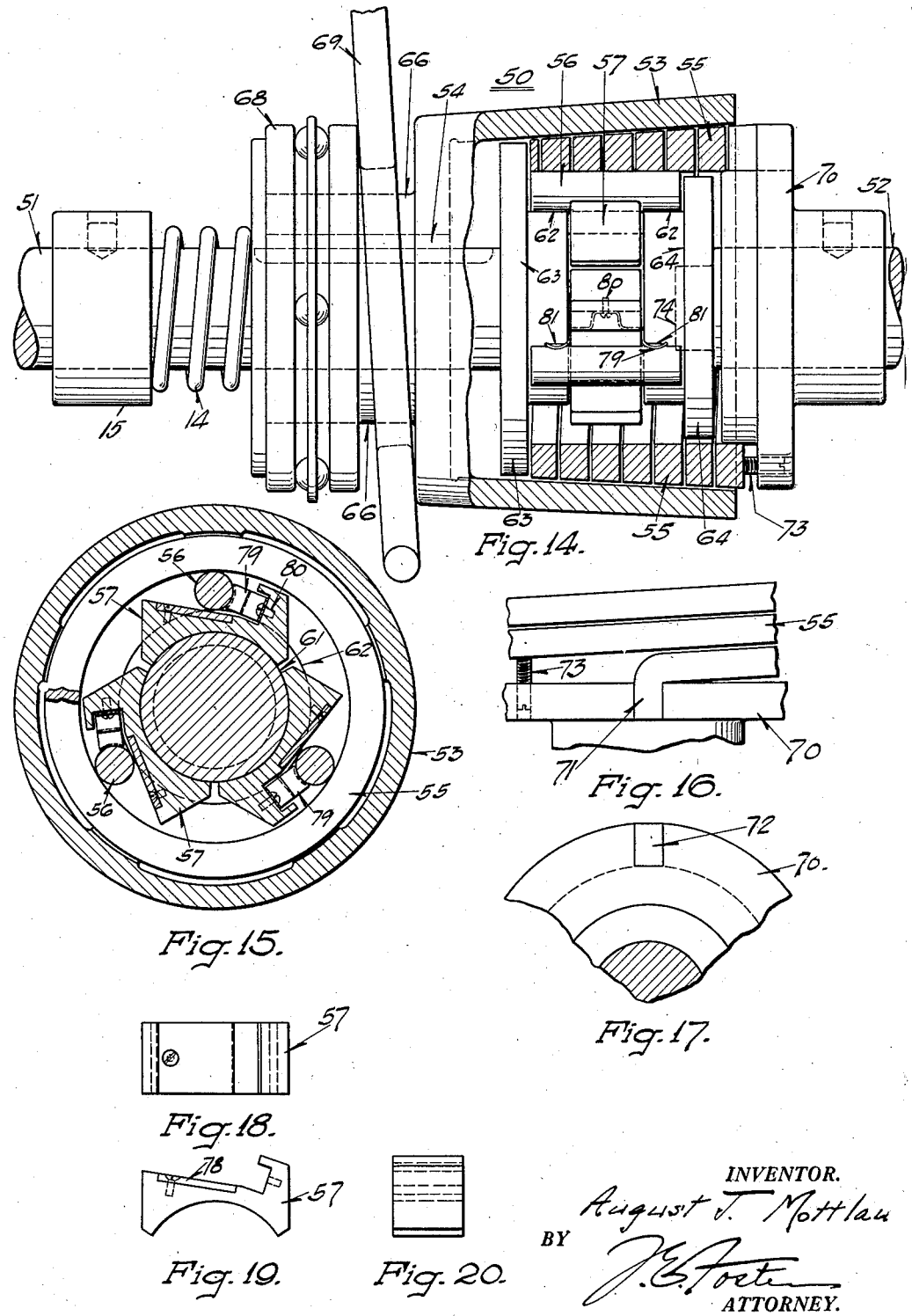
INVENTOR.
August J. Mottlau
BY
ATTORNEY.

Patented Sept. 22, 1936

2,055,239

UNITED STATES PATENT OFFICE 2,055,239

CLUTCH

August J. Mottlau, Pittsburgh, Pa., assignor, by direct and mesne assignments, to Julius E. Foster, Pittsburgh, Pa.

Application November 24, 1931, Serial No. 576,980

17 Claims. (Cl. 192—48)

This invention relates to clutches and particularly to one-way or uni-directional clutches.

One object of this invention is to provide a clutch that shall function as a clutch in one direction of rotation and as an anti-friction device in the other direction of rotation.

Another object of the invention is to provide a clutch that shall function instantaneously as a clutch in one direction of rotation and that shall release instantaneously in the opposite direction of rotation.

Another object of the invention is to provide a clutch of the roller-and-cam type that is modified to obviate the necessity of close mechanical tolerances.

Another object of the invention is to provide a clutch which may be controlled to function as a one-way clutch under certain conditions, or as a solid connection in both directions under other conditions.

Another object of the invention is to provide a clutch that shall be suitable to function as a selective free-wheeling device for automotive vehicles, and that shall be simple and rugged in construction and satisfactory in its operation.

Another object of the invention is to provide a clutch of the foregoing character in which a roller-and-cam clutching action is established, but which is permitted to declutch instantaneously without the necessity of employing a large declutching force.

In clutches heretofore made, and still used, of the cam-and-roller type, the clutch consists of an inner rotating member upon which the cam elements are supported, and the rollers rest on the inclined surfaces of the cams, being biassed to rest against the cam surfaces by springs. The rollers are limited in their movements in response to the biassing action of the springs by their engagement with the inner rolling surface of the outer race. When the inner member rotates in one direction the action of the rollers on the inner surface of the outer race tends to move the rollers away from the cam against the biassing action of the spring. When the inner member tends to turn in the opposite direction the rollers immediately move upward onto the inclined surface of the cam, and cause a binding action between the cam on the inner race and the surface of the outer race, thereby connecting the two races as a solid mechanical connection through which mechanical power may be transmitted.

The disadvantage of clutches of this type is that after clutching action has been established, the force that is necessary to declutch or to separate the clutch elements is substantially one-third of the ultimate or final locking force which forced the rollers onto the cam and between the cam and the outer race, in transmitting the desired amount of power.

In the present invention, instead of utilizing a solid cylindrical outer race as has been the practice heretofore, I utilize a flexible helical spring of substantial strength as the outer race in one instance, and the same spring with a supporting cylinder behind it in another instance. In each case the clutching action is caused by the binding of the rollers between the cams and the spring. Upon the reversal of the direction of rotation, however, between the two elements of the clutch, the spring due to its resiliency, readily and instantaneously moves in such direction as to permit the roller to move out of its binding position easily and without the impression of an excessive force. The spring actually immediately releases the roller upon a change in the direction of rotation so that no force is necessary to cause a declutching action.

Where the clutch is employed as a selective free-wheeling device for controlling the connection between the drive and the driven shafts of an automobile, the free-wheeling or uni-directional clutching action is established between the spring as one clutch element, connected to the driven shaft, and the cams and rollers, jointly, as the other clutch elements, associated with the drive shaft. The pitch of the spring is in such direction that it will tend to contract and grip the rollers when the drive shaft actuates the driven shaft, in which case the rollers move, or tend to move, up on the inclined surface of the associated cams. When the driven shaft rotates faster than the drive shaft, the spring merely rests upon the rollers as an outer race of a roller bearing, while the rollers roll upon an inner race on the drive shaft, separate from the cams. The cams are movable, and, when the device functions as a roller bearing, the cams move around with the rollers as spacers or separators between them.

The device thus acts as a clutch when the drive shaft is driving, and as an anti-friction bearing when the driven shaft tends to drive or rotate faster than the drive shaft.

When a solid connection is desired between both shafts, an outer sleeve is moved onto the spring, both the sleeve and the spring being complementarily tapered to permit free shifting movement to establish engagement or disengagement between the sleeve and the spring. When the drive shaft tends to rotate faster, the device will function as a clutch by establishing the previously described clutching action between the rollers and the spring, whereas when the driven shaft rotates faster, clutching action will be established between the spring and the sleeve. In that case the action of the sleeve is to open or expand the spring and cause it to grip the sleeve tightly. The device will thus function as a clutch in both directions to transmit power, irrespective of the relative rotation of the two shafts.

Two modifications of devices embodying the principles of my invention are illustrated in the accompanying drawings, in which—

Figure 5 is an exploded side elevational view of the various elements entering into the combination of the clutch;

Figure 6 is a side elevational view of a roller employed in the clutch;

Figure 7 is an end elevational view of the roller shown in Figure 6;

Figure 8 is an edge view in elevation of one of the cage walls;

Figure 9 is a front elevational view of the cage wall in Figure 8;

Figure 10 is a front elevational view of an assembly of a pair of the cams or shoes;

Figure 11 is an end elevational view of one of the shoes;

Figure 12 is a side elevational view of a rivet pin for securing the two walls of the cage in proper spaced relationship;

Figure 13 is an end elevational view of the rivet pin shown in Figure 12;

Figure 14 is a side elevational view, with parts broken away and with parts shown in section, of the second modification of a clutch embodying the principles of this invention;

Figure 15 is a sectional view of the clutch taken through the rollers, as viewed from the driven end;

Figure 16 is a plan view of the outer terminal convolution of the clutch spring and the flange in which it is anchored and illustrates how the spring is connected to the flange;

Figure 17 is a side elevational view of the portion of the flange provided with the slot for receiving the terminal of the spring shown in Figure 16;

Figures 18, 19 and 20 are respectively plan, side and front views of the cams or shoes employed in the clutch as shown in the sectional assembly in Figure 15; and Figure 21 is a schematic arrangement of a lever system for controlling the clutch on an automobile.

Figure 1:
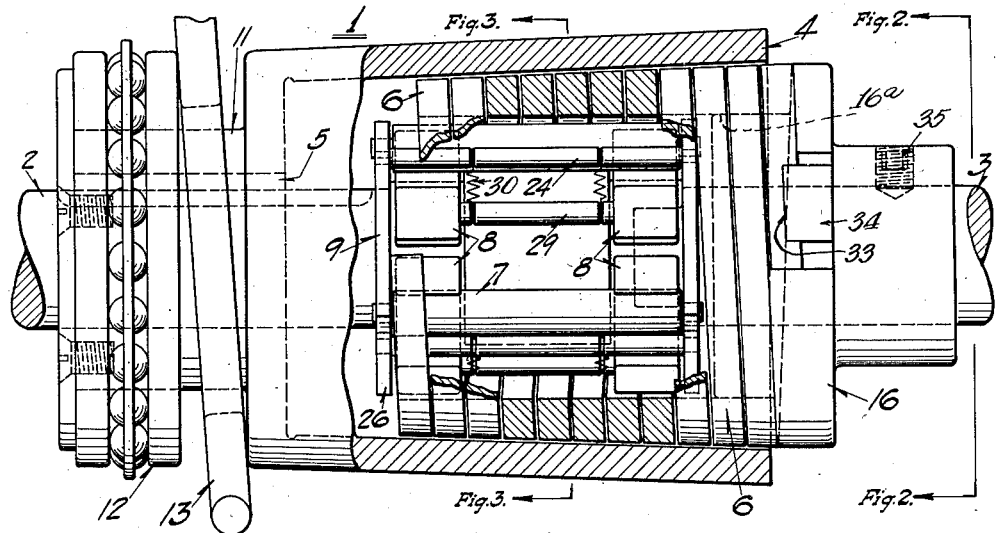
Figure 1 is a side elevational view, with parts broken away and parts shown in section, of one modification of a clutch device embodying the principles of this invention.
Figure 2:
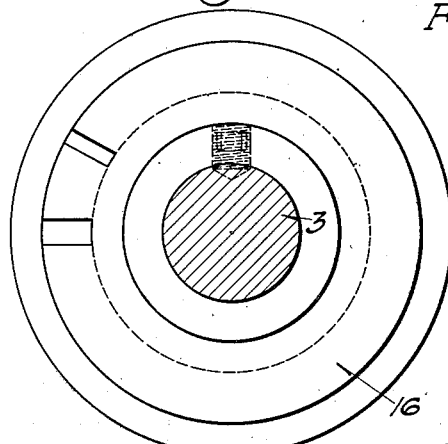
Figure 2 is an end elevational view of the clutch in Figure 1, taken from the driven end, as indicated by the line 2—2 on Figure 1.

As illustrated in the view shown in Figure 1, a clutch 1 embodying the principles of this invention is mounted between a drive shaft 2 and a driven shaft 3. The clutch 1 comprises an outer cup or casing 4 splined on the drive shaft 2 by a key 5; a helical clutching or driving spring 6 within the cup or casing 4 and connected to the driven shaft 3; and three rollers 7 and three cams 8 supported in a cage 9 and all disposed within the spring 6.

The cup or casing 4 is provided with a neck or bearing section 11 by means of which it is splined on the drive shaft 2 to permit the cup to be moved into or out of engagement with the spring 6. In order to facilitate such movement, the cup is divergingly tapered toward its mouth and the spring is convergingly tapered with the same inclination toward the end that fits into the inside of the cup.

In order to move the cup freely while power is being transmitted between the two shafts a thrust-bearing 12 is provided, against which a forked lever 13 may be pressed to move the cup out of engagement with the spring. If the cup is to be held out of engagement with the spring the lever 13 may be latched by any suitable means such as will be hereinafter described. When the cup is moved out of engagement with the spring by pressure against the thrust-bearing 12, a return biassing spring 14 is compressed between the thrust-bearing 12 and a fixed bushing 15 on the drive shaft 2.

The cup 4, when in its withdrawn position, may therefore be rotated by, and with, the drive shaft 2 independently of the other clutch elements so long as the forked lever 13 is held or latched in corresponding position. When the forked lever 13 is released, the return biassing spring 14 immediately forces the cup 4 back into engagement with the spring 6.

The spring 6 is a closely wound helical spring with the internal surfaces of its convolutions in a cylindrical plane concentric with the axis of the clutch. The outer surfaces of the convolutions of the spring are in the outline of a truncated cone, the spring being tapered on its outer surface to permit the ready engagement and disengagement of the cup 4. The inner end of the spring 6 where it fits into the cup is free and the outer end of the spring is mechanically connected to a flange bracket 16 that is secured to the driven shaft 3 and serves to connect the spring to that shaft. The spring thus constitutes one element of the clutch for connecting the driven shaft to the drive shaft or for disconnecting the two shafts.

The cup 4 constitutes the other element of the clutch, being connected to the drive shaft 2. The direction in which the spring is wound is such that relatively faster rotation of the driven shaft 3 would tend to unwind or enlarge the spring 6 thereby causing the spring to grip the cup tightly on its inner surface and to establish solid clutching action between the cup and the spring. Normal forward rotation of the drive shaft 2, however, tends to wind or diminish the spring diameter, thereby preventing clutching action, between the spring and the cup.

The rollers 7 and the cams 8 that are mounted on the drive shaft 2 also function as clutch elements and serve to connect the drive and the driven shafts when the drive shaft supplies power to the driven shaft. The rollers 7 and the cams 8 serve as clutch elements for the drive shaft 2 and the spring 6 serves again as the clutch element for the driven shaft 3. The arrangement of the clutch elements is such that the rollers tend to roll up onto the cams when the drive shaft 2 is driving the driven shaft 3, but tend to roll off and away from the cams when the driven shaft rotates or tends to rotate faster than the drive shaft. At the same time, the spring 6 tends to contract and tighten against the rollers when power is transmitted from the drive shaft and the rollers ride up on the cams. The combined action of the rollers and of the spring establishes positive clutching action. The flexible nature of the helical spring and its anchorage at one end only permit the spring to adjust itself in accordance with the tension developed therein by the torque or power that is being transmitted through the spring. The spring thus adjusts itself to distribute the load to be transmitted by equalizing the pressure upon the rollers and the load individually transmitted by them.

As soon as the driven shaft rotates, or tends to rotate, faster than the drive shaft, however, the spring immediately expands and moves to roll the rollers down off the cams to declutch the two shafts.

The rollers are so supported and spaced that they normally move as planetary rollers and revolve in a path concentric with the central axis of the device.

In order that the rollers 7 may function as anti-friction elements when they are not working as clutch elements the drive shaft 2 is provided with a large section serving as an inner race 17 for the rollers. The dimensions of the race, of the rollers, and of the internal diameter of the spring 6 are such that the spring serves as the outer race for the rollers during non-clutching operation, thereby constituting the device an anti-friction bearing when it is not functioning as a clutch.

As illustrated in this construction, three pairs of cams and three rollers are employed, although any number may be employed depending upon the space requirements and the dimensions of the device as a whole. Preferably, however, an odd number of rollers should be used.

As illustrated, the cams are each provided with a seating section 20 to rest on the drive shaft, an inclined section 21 for the rollers, a back stop section 22 to limit the backward movement of the rollers and head portions 23 by means of which the cams are riveted together in pairs at suitable distances by means of a rivet rod 24.

The seating section 20 of each cam has a seating curvature corresponding to the curvature of the periphery of the drive shaft 2 and is arranged to rest against the drive shaft. The length of the seating section is slightly less than a third of the peripheral distance in order that the three cams may have a slight space between them to permit self adjustments during operation. The inclined section of each cam is slightly inclined with respect to a tangent at the point of contact between the roller and its inner race where the roller also touches the inclined surface of the cam. In order to provide for relatively free movement of the roller on its inner race the inclined surface of the cam may be made to go below the circular plane of the race 17 for the rollers.

In order to synchronize the movements of the rollers and also in order to properly space them, the cage 9 is provided with two side walls 26 having equidistantly spaced radial slots 27 for receiving journals 28 of the rollers 7. The rollers are thus free to move radially in the slots in the cage while they are adjusting themselves on the inclined surfaces 21 of the cams 8.

The two side walls 26 of the cage are riveted together in corresponding position by three cross pins or rods 29. In order to provide a slight biassing force to bias the rollers and the cams together so that the rollers will always be in a position to immediately engage the cams when such action is desired, springs 30 are connected between the cross pins 29 of the cage and the rivet rods 24 of the cams, in such manner as to bias the cams toward and under the rollers. These springs are relatively light and are not strong enough to force the cams under the rollers to cause the rollers to move away from the inner race 17 upon which they normally ride, due to the strength of the confining spring 6 which serves as the outer race for the rollers.

The operation of the device may now be described. It will be considered first when used as a free-wheeling device on an automobile in which case the cup 4 is withdrawn from engagement with the spring 6.

The direction of normal rotation for forward movement of the vehicle will be taken as counter-clock-wise in the drive shaft, viewed from the driving end. As will be seen upon reference to Figure 3, which is viewed from the driven end, however, rotation of the drive shaft in normal driving direction (clock-wise as viewed in Figure 3) is such as to cause the rollers to ride up on the inclined surfaces of the cams to start a binding action between the cams and the spring 6. Such rotation also immediately causes the spring to contract or to tend to contract due to the characteristics of the helical spring, and the various forces and reaction forces between the springs, the rollers, the cams and the drive shaft all combine to establish a solid clutching connection between the drive shaft 2 and the spring 6, thereby solidly connecting the drive shaft 2 and the driven shaft 3.

As long as the drive shaft is rotating, or tending to rotate, faster than the driven shaft, and imparting a driving force to the driven shaft, the clutching action between the spring and the rollers on the cams is maintained. However, as soon as the driving force of the drive shaft is removed, so that the driven shaft will tend to rotate, or rotate, faster than the drive shaft, the spring immediately changes its character and instead of tending to confine and grip the rollers tightly, it tends to expand because of the new direction in which it is being moved against the rollers, while at the same time the rollers are being turned in such direction as to move downward off the inclines of the cams, and, as a result, both the rollers and the spring are tending to separate from each other and to establish declutching action. Because of the inherent resiliency of the spring the declutching action is soft and immediate, and imposes no shocks on the parts of the clutch. As soon as such declutching operation has been established the rollers move immediately to engagement with the inner race upon which they rotate and support the spring at the same time as the outer race, whereupon the unit continues to function, but as a roller bearing.

Thus, so long as the drive shaft tends to rotate the driven shaft to transmit power thereto, the device functions as a clutch, but as soon as the driven shaft tends to turn the drive shaft or to rotate faster than the drive shaft, as, for example, due to the momentum of the car when the car is coasting, the device immediately declutches and functions as an anti-friction bearing.

Since the cams are free to move on the drive shaft they revolve around the shaft with the rollers and function as the spacers in an ordinary anti-friction bearing. The foregoing operation occurs when the clutch is in its free-wheeling position. When such free-wheeling operation is no longer desired, the forked lever 13 is unlatched to permit the biassing spring 14 to move the cup or casing 4 into engagement with the outer surface of the spring 6.

The drive shaft and the driven shaft are now solidly connected irrespective of which shaft tends to rotate faster or to transmit energy to the other. If the drive shaft is the source of power and tends to transmit power to the driven shaft, the clutch functions as previously described, to cause the rollers to ride up onto the cams, and to cause contraction and strangulation of the spring, thereby establishing clutching action between the two shafts. If, on the other hand, due to the momentum of the vehicle the driven shaft tends to transmit power back to the drive shaft, the spring 6 tends to expand and engages the inner surface of the cup 4 more firmly, thereby establishing a solid driving connection between the driven shaft and the drive shaft.

Thus when the cup is in engagement with the spring 6 the clutch functions as a solid connection between the two shafts, whereas when the cup is withdrawn from engagement with the spring the clutch device functions selectively as an overrunning clutch to permit the transmission of power from the drive shaft to the driven shaft but not in the reverse direction.

In order to establish more positive clutching action between the spring and the cup, the inner surface of the cup, in addition to being tapered to fit the spring, is fluted to provide several spaced high points or ridges 31 and grooves or troughs 32 between them. With this construction in the cup, the spring 6, due to its resiliency, can form slight temporary corrugations, while under stress, to fit into the grooves and thereby establish gear-like meshing or locking between the spring and the cup. Such slight corrugations or bends, being stressed out of normal shape, tend to resume their normal original shapes and thereby also aid to establish immediate declutching action upon cessation of power transmission from the driven shaft to the drive shaft.

The outer surface of the spring thus functions to engage and grip the cup, whereas the inner surface of the spring engages and grips the rollers. In either case, the spring is stressed out of normal shape during clutching or gripping action and tends to resume its initial normal shape as soon as declutching or non-gripping action is to be established. The declutching in either case is therefore soft and gradual, and free of any binding or locking.

As shown in Figures 1 and 5, the inner surface of the spring-connecting flange 16, on the driven shaft 3 is inclined to the pitch of the spring 6 to provide a proper end rest and to obviate any tendency for the spring to straighten its pitch. The outer terminal of the spring 6 is provided with a recess or groove 33 which receives a correspondingly shaped and sized lug 34 on the flange 16. The flange 16 is secured to the driven shaft 3 in any suitable manner, as by a screw 35. The flange also embodies an inner shoulder 16a for supporting the end convolutions of the spring 6 that are not supported by the rollers.

Figure 3:
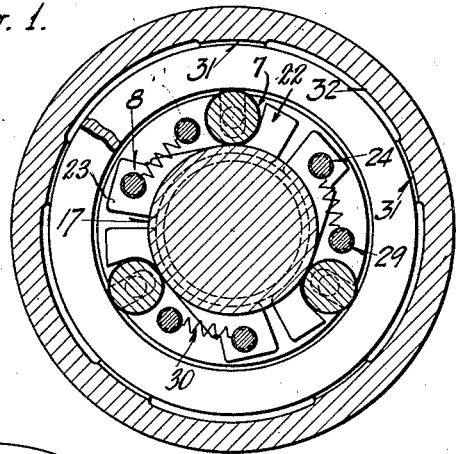
Figure 3 is a sectional view through the rollers of the clutch, viewed from the driven end, as indicated by line 3—3 on Figure 1.
Figure 4:
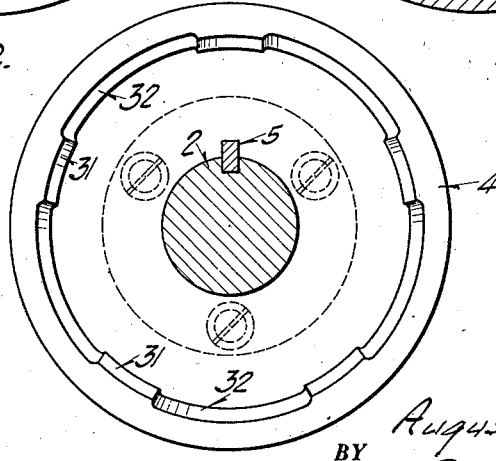
Figure 4 is a sectional view through the sleeve or outer cup of the clutch and through the spline key by which the sleeve is secured to the drive shaft, as viewed from the driven end.

Upon referring to Figures 3 and 5, it will be observed that the raceway 17 for the rollers 7 is higher than the raceways 18 for the cams 8. Because of these relative heights of the raceways 17 and 18 for the rollers and for the cams, and the mobility of the cams, the responsiveness of the rollers to establish clutching or non-clutching action is relatively sensitive and immediate.

As shown in Figures 1 and 5, the driven shaft 5 is provided with a journal 19 that fits into a receiving recess in the end of the drive shaft to assist in maintaining the alignment of the two shafts.

The operation and control of the forked lever 13 for shifting the cup 4, to engage or to disengage the spring 6, in order to establish direct drive or free-wheeling connection between the drive shaft 2 and the driven shaft 3, is illustrated schematically in Figure 21, in connection with various other operating levers by means of which the clutch may be selectively controlled.

The normal position of the forked clutch lever 13 is its unlatched position, at which the cup 4 is biassed to engage the spring 6. When free-wheeling connection is desired between the drive shaft and the driven shaft, the forked lever 13 is arranged to be actuated by a suitable pedal or lever 36 to move the clutch lever 13 to free-wheeling position, in which it is held by a latch 37 and a latch-biasing spring 38 The clutch lever 13 may be released from its latched position by a reset lever 39, which may be operated in any desirable manner, as by means of a lever or a push rod or similar mechanical movement, when it is desired to discontinue the free-wheeling operation and to connect the drive shaft and the driven shaft through a direct connection.

The latch 37 may also be arranged to be actuated to releasing position, to discontinue free-wheeling operation, by means of an auxiliary pedal 40 upon actuation of the usual brake pedal 41. By means of such an arrangement the braking effort of the engine may be utilized when the car is in motion so that less work need be done by the braking system of the vehicle. Any suitable lost motion arrangement may be employed between the brake pedal and the tripping lever 40. By way of illustration only, I have illustrated an inclined cam 42 and a spring-biassed bell-crank 43 as typical of a lost motion connection between the brake pedal and the tripping lever 40. The biassing action is provided by a spring 44, and a stop 45 is provided to limit the movement of the bell-crank 43. The stop 45 may be any suitable element on a stationary part of the casing or frame of the vehicle, or of the vehicle engine.

In order to provide a direct connection between the drive shaft and the driven shaft when it is desired to operate the vehicle backward by, and, consequently, to place the gear mechanism in "reverse" position, the gear shift lever is also arranged to operate a trip lever 46 to actuate the latch 37 to its release position, to permit the clutch lever 13 to be released and to permit the return biassing spring 14 to move the cup 4 into engagement with the spring 6.

By disposing the free-wheeling pedal 36 adjacent the usual brake pedal 41, on one side of the pedal 41, and the release cam 42 on the other side, and adjacent or under the brake pedal 41, the entire control of the free-wheeling clutch may be taken care of by the foot of the driver without requiring the use of his hand. With the arrangement as illustrated, the advantage of the decelerating effort of the engine is available before the brake system of the vehicle is resorted to. Such flexibility of control of the free-wheeling unit is possible, of course, only because it is not necessary to synchronize the sleeve 4 and the spring 6 in order to engage those elements for a straight-through connection between the drive shaft and the driven shaft.

The driver of the vehicle therefore always has immediate control of the vehicle even though the clutch is in free-wheeling position.

Where such control by the brake pedal is not desired, the reset lever 39 alone may be utilized to release the latch to terminate the free-wheeling operation.

In Figures 14 to 20, inclusive, is illustrated another form of combination clutch embodying the principles of this invention.

This combination clutch 50 comprises a drive shaft 51, a driven shaft 52 co-axially aligned therewith, a sleeve 53 splined on the drive shaft 51 by a suitable spline or key 54, a helical spring 55 secured to the driven shaft 52 and a plurality of rollers 56 and cams 57 resting on the drive shaft 51.

The principles of operation of this clutch are the same as those of the modification previously described.

Instead of employing a cage, in this modification, to properly space the rollers and to keep them in parallel alignment, a spool-shaped body is provided on the end of the drive shaft 51, which is constructed to have an inner or lower raceway 61 for the cams 57 and an upper raceway 62 for the rollers 56. The two walls 63 and 64 of the spool body serve to hold the rollers against edgewise movement or twisting, while the inner wall 63 being somewhat higher than the wall 64 also serves as a stop or limiting wall for the spring 55. The sleeve or cup 53 is provided with a bearing section 66 which is splined to the drive shaft 51 by the spline key 54 or an equivalent device. An anti-friction end-thrust bearing 68 is provided through which the movement of the sleeve 53 may be effected by means of a pivoted shift lever 69. A biassing spring 14 is employed, as in the other modification.

In the present construction the sleeve 53 and the spring 55 are provided with complementary tapering surfaces, as was described in connection with the first modification, in order to provide a relatively close interfitting relationship. The outer end of the spring is connected to the driven shaft 52 by a similar flange plate 70. The outer end of the spring 55 may be mechanically connected to the flange 70 in any suitable manner, such connection being established in the present modification by means of the end 71 of the spring being turned to fit into a recess 72 in the flange 70. The inner face of the flange 70 may be provided with an inclined surface corresponding to the pitch of the spring 55 in order to provide a proper end rest for the end convolution of that spring, and to prevent any tendency of the spring to sidedrift, as in the other modification or stop elements 73 may be properly disposed on the flange. The other end of the spring 55 is ground flat so that it will rest against the surface of the inner wall 63 of the spool body around the entire side surface of the inner end convolution.

In this modification, as in the previously described modification, the end of the driven shaft is provided with a small journal 74 which fits into a recess in the end of the drive shaft.

When the sleeve 53 is withdrawn from contact with the spring 55, uni-directional clutch action is established between the drive shaft and the driven shaft in such manner that when the drive shaft rotates in a clockwise direction, as viewed from the driven end, the rollers 56 will tend to roll up onto the cams 57 and bind against the spring 55. The spring 55 at the same time will tend to contract since the movement of the rollers is such as to tend to contract it in diameter, thereby causing it to grip the rollers more firmly. The simultaneous and joint pressure action of the rollers and reaction pressure of the spring instantaneously establishes clutching action and joins the drive and the driven shaft to permit the transmission of power from the drive shaft to the driven shaft.

As soon as the driven shaft tends to rotate, or does rotate, faster than the drive shaft, however, the movement of the spring is such with respect to the rollers that the spring tends to roll along the rollers in a direction that expands the spring, thereby opening it to a larger diameter, and at the same time also moves the rollers in such direction as to roll them down off the cams.

Because of the natural resiliency of the spring and its declutching characteristics under such conditions, the spring releases the rollers instantaneously upon a change in the relative direction of rotation of the driven shaft with respect to the drive shaft, and no force is necessary to release the spring and the rollers to declutch the two shafts. Clutching action is immediately terminated and the spring rolls upon the rollers as the outer race of a roller bearing, while the rollers rotate upon their inner race and move the cams around between them as spacers or separators.

In order to avoid the use of steel cams on the surface of the shaft, the cams 57 may be made, as illustrated, of a bearing material that is relatively hard and strong, such as a hard brass or bronze. In order to provide a surface, however, that is strong enough to sustain the compression forces of the rollers during clutching action, a heat treated steel spring or plate 78 is secured to each cam 57 to provide a hard, strong surface for the rollers during clutching action.

In order to bias the rollers towards the cams so that clutching action may be established immediately, without too much lost motion or back lash, a biassing spring 79 is disposed between each roller and the back end of its associated cam, to which it is secured by a screw 80.

The roller-biassing spring 79 consists of a tempered steel spring having two openings 81 punched therein, to permit the spring to seat itself readily on the rollers. The central section and the end sections are bent backwardly from the normal flat plane of the spring so that the edges of the spring alongside the holes 81 will engage the rollers and thereby contribute to holding the biassing springs 79 in position.

As was previously described, when the sleeve or cup 53 is withdrawn from engagement with the clutch spring 55, the rollers and the spring function as a one-way clutch to permit the drive shaft to actuate the driven shaft in a forward direction, while the driven shaft may immediately disconnect itself from the drive shaft when it tends to rotate faster than the drive shaft.

When it is desired to establish a solid connection between the drive shaft and the driven shaft the sleeve 53 is moved into engagement with the spring 55, and, as was explained in connection with the first described modification, the drive shaft will continue to drive the driven shaft in a forward direction. Upon the tendency of the driven shaft to move faster than the drive shaft due to the momentum, for example, of the parts to which the driven shaft is connected, the spring 55 again acts as a clutch member, but, in that direction of movement it tends to expand or open its convolutions against the cup, thereby establishing solid clutch action so that the driven shaft remains mechanically connected to the drive shaft. The cup is preferably fluted internally as was previously described in the other modification.

By means of the foregoing structures, or their equivalents, selective clutching action may be established between a drive shaft and a driven shaft to establish the various driving operations described, as desired.

By the use of a helical spring as an outside clutching member in connection with cams and rollers, a positive and instantaneous clutching action is established which does not require an excessive force to establish declutching action, and the serious disadvantage of the roller or ball clutches of the past has been overcome, in which the locking or binding of the ball or roller between the cam and the outer race necessitated the use of an excessive force to separate them.

Moreover, by means of the use of a flexible spring as the outside clutch element in connection with the cams and rollers, a positive clutching action is established at each roller and cam, since the spring is flexible and may adjust itself readily to the slight extent necessary to cause clutching action between itself and each roller. Such action has not been the case in the past where a solid sleeve or cylinder has been used as the outer race, since in that case only one ball or one roller has actually served to establish the clutching action and that one roller or one ball then had to transmit the entire load. Because of the excessive pressures developed, for that reason, a tight locking action was effected which then required a relatively large unlocking force to establish declutching action.

The arrangement of levers for controlling the clutch action permits the two shafts to be readily coupled under various conditions. The lost motion connection with the brake pedal permits selective connection of the shafts before braking, or it may be utilized to restart the engine if it has stalled during a free-wheeling operation. Such action, in spite of the non-synchronous action of the two shafts, is possible because the clutch elements may be connected without synchronizing.

My invention is not limited to the specific details of construction, nor to the particular applications that are illustrated, since various modifications or uses may be resorted to without departing from the spirit and scope of the invention as set forth in the appended claims.

I claim as my invention:

1. A one-way clutch comprising an inner circular race, one or more cams on said race and movable relative to the race and each having an outer inclined surface, a roller associated with each cam and adapted to move onto or off the inclined surface, and an outer race for the rollers embodying a helical spring.

2. A clutch, comprising an inner race, a plurality of anti-friction elements thereon, a plurality of moveable cams on the race and serving also as spacers for the anti-friction elements, and an outer race for the anti-friction elements consisting of a helical spring.

3. A clutch comprising an inner race, a plurality of cams thereon, each cam having a roller associated therewith, a spring associated with each roller to bias it onto the cam, and means constituting an outer race, said means consisting of a helical spring having its inner surfaces in a cylindrical plane and its outer surfaces tapered in the plane of a cone, and a sleeve for the spring having a tapered recess to receive the spring.

4. A clutch as specified in claim 3 plus means for shifting the tapered sleeve onto or off the tapered spring.

5. A clutch for connecting two shafts comprising a plurality of cams and rollers on the first shaft; a helical spring encircling and engaging the rollers and connected to the second shaft and wound in such direction that rotation of the first shaft faster than the second shaft will cause the rollers to ride upon the cams and will cause the spring to contract, thereby securely clutching the two shafts, whereas rotation of the second shaft faster than the first causes the spring to expand and to move the rollers from the cams, thereby declutching the two shafts; and a sleeve splined on the first shaft and moveable to engage and encircle the spring, to cause solid clutching action between both shafts, due to the spring and the sleeve, and the spring and the rollers, irrespective of which rotates, or tends to rotate faster.

6. A clutch for connecting two shafts comprising a helical spring connected to one shaft, a plurality of cams and rollers on the other shaft and disposed within the helical spring, and a sleeve splined on the shaft with the rollers and disposed to engage the outside of the spring.

7. A clutch as in claim 6 in which the spring and the sleeve are complementarily tapered, and means for shifting the sleeve into, and out of, engagement with the spring.

8. A clutch comprising an inner race, a plurality of cams and rollers thereon, and a helical spring serving as an outer race for the rollers in one direction of rotation and as a clutch element in the other direction of rotation, the cams and the spring permitting free rotation of the rollers in the first-mentioned direction.

9. A clutch for connecting two shafts to selectively permit unit-directional or bi-directional operation, comprising a cam and roller assembly on one shaft as one clutch element, a helical spring encircling the rollers and connected to the other shaft to constitute a co-operating clutch element, the spring being so wound as to grip the rollers against the cams in one direction of rotation and to ride upon the rollers freely without gripping, in the other direction of rotation, and a sleeve splined upon the first-mentioned shaft movable into and out of engagement with the spring to function as a clutch element therewith in the direction in which the spring rides freely on the rollers.

10. A clutch for controlling the transmission of power between two shafts comprising a helical spring having one end connected to one shaft, the spring having the inner surfaces of its convolutions substantially in a cylindrical plane and the outer surfaces of its convolutions tapered in the shape of a truncated cone, means including roller and cam assemblies on the second shaft for co-operating with the inner surface of the spring to establish clutching action, and a sleeve on the second shaft for co-operating with the outer surface of the spring to establish clutching action.

11. A clutch for connecting two shafts or other members comprising a sleeve having a tapered inner wall with spaced longitudinal recesses and ridges between the recesses, a helical spring having its outer surface tapered to fit into the sleeve and engaging the ridges on the inner surface of the sleeve, and a plurality of rollers and cams within the spring and disposed to engage the spring in one direction of rotation, the number of rollers being preferably odd and the number of recesses in the sleeve greater than the number of rollers.

12. A mechanical movement comprising a circular member constituting an inner raceway, a helical resilient member having a cylindrical inner surface and concentrically disposed around the circular member to constitute an outer raceway, a plurality of spaced rollers disposed between the two raceways to roll freely on said raceways, one end of the helical resilent member being anchored and the other end being free to tighten or loosen the grip of said helical member upon the rollers, and means movable with the rollers to keep them in spaced relation.

13. A mechanical movement to constitute an anti-friction bearing comprising a cylindrical member to constitute an inner race, a plurality of spaced rollers thereon parallel to the axis of the inner race, an outer race for the rollers consisting of a resilient helical member, one end of the helical resilient member being anchored and the other end being free to tighten or loosen the grip of said helical member upon the rollers, and means for maintaining the rollers in spaced relation.

14. A mechanical movement to constitute an anti-friction bearing comprising a cylindrical member to constitute an inner race, a plurality of spaced rollers thereon parallel to the axis of the inner race, an outer race for the rollers consisting of a resilient helical member, one end of the helical resilient member being anchored and the other end being free to tighten or loosen the grip of said helical member upon the rollers, and means movable with the rollers for maintaining the rollers in spaced relation.

15. A mechanical movement comprising a circular member constituting an inner raceway, a plurality of spaced rollers symmetrically arranged around the raceway and engaging the raceway to roll thereon, a helical resilient member having a cylindrical inner surface and disposed around the rollers to constitute an outer raceway for the rollers, one end of the helical resilient member being anchored and the other end being free to tighten or loosen the grip of said helical member on the rollers, and means movable with the rollers to keep them in spaced relation.

16. A mechanism for connecting and transmitting power between a drive shaft and a driven shaft, comprising a driving member, a driven member, and means for transmitting motion between said members comprising a plurality of planetary rollers actuated by the driving member, and a resilient helical spring engaging the rollers, and functioning, by the tension developed in said spring during operation, to equalize the load transmitted by them.

17. A mechanism for connecting and transmitting power between a drive shaft and a driven shaft, comprising a driving member, a driven member, and means for transmitting motion between said members comprising a plurality of planetary rollers actuated by the driving member, and a resilient helical spring engaging the rollers and having one end free to enable the spring to function in accordance with the tension developed therein, during operation to vary its gripping action in response to varying load on the driven member and to equalize the load on the rollers.

AUGUST J. MOTTLAU.